United States Patent
Miyajima et al.

(10) Patent No.: US 9,105,915 B2
(45) Date of Patent: Aug. 11, 2015

(54) FUEL CELL STACK COUPLED TO A HUMIDIFIER VIA AN INCLINED CHANNEL

(75) Inventors: Kazuyoshi Miyajima, Utsunomiya (JP); Masaharu Suzuki, Utsunomiya (JP); Satoshi Iitaka, Saitama-ken (JP); Hideharu Naito, Utsunomiya (JP); Yohei Hidaka, Utsunomiya (JP); So Fujiwara, Yaita (JP); Kaoru Fukui, Sakura (JP); Masahiro Matsutani, Utsunomiya (JP); Nariyuki Yoshinaga, Ustunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 622 days.

(21) Appl. No.: 12/694,108

(22) Filed: Jan. 26, 2010

(65) Prior Publication Data
US 2010/0190068 A1    Jul. 29, 2010

(30) Foreign Application Priority Data

Jan. 26, 2009   (JP) ................................ 2009-014447
Sep. 24, 2009   (JP) ................................ 2009-218892

(51) Int. Cl.
| | | |
|---|---|---|
| *H01M 8/02* | (2006.01) | |
| *H01M 8/04* | (2006.01) | |
| *H01M 8/24* | (2006.01) | |

(52) U.S. Cl.
CPC ............. *H01M 8/241* (2013.01); *H01M 8/02* (2013.01); *H01M 8/0247* (2013.01); *H01M 8/04126* (2013.01); *H01M 8/2465* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 6,602,625 B1 * | 8/2003 | Chen et al. ................... | 429/414 |
| 6,936,369 B1 | 8/2005 | Komura et al. | |
| 7,087,328 B2 * | 8/2006 | Shimanuki et al. ........... | 429/414 |
| 2001/0021467 A1 * | 9/2001 | Suzuki et al. .................. | 429/12 |
| 2004/0110057 A1 * | 6/2004 | Yoshimoto et al. ............ | 429/38 |

(Continued)

FOREIGN PATENT DOCUMENTS

| | | |
|---|---|---|
| JP | 11-111316 | 4/1999 |
| JP | 2000-90954 | 3/2000 |

(Continued)

OTHER PUBLICATIONS

Japanese Office Action for Application No. 2009-014447, dated May 24, 2011.

(Continued)

*Primary Examiner* — Gregg Cantelmo
(74) *Attorney, Agent, or Firm* — Nelson Mullins Riley & Scarborough LLP; Anthony A. Laurentano

(57) ABSTRACT

An end plate of a fuel cell stack is directly fixed to a humidifier. A resin pipe is attached to an oxygen-containing gas outlet of an end plate through a resin coupling pipe. The resin pipe includes one end having a large diameter and the other end having a small diameter. The other end is provided at an off gas supply channel of the humidifier. The off gas supply channel includes an inclined channel. The other end extends up to an end of the inclined channel where inclination of the inclined channel is started. An off gas ejection port is formed at the other end. The off gas ejection port is opened to the end of the inclined channel where inclination is started. Condensed water returned along the inclined channel flows from the off gas ejection port into the resin pipe.

2 Claims, 13 Drawing Sheets

(56) References Cited

U.S. PATENT DOCUMENTS

| | | | |
|---|---|---|---|
| 2007/0122669 A1* | 5/2007 | Kusano et al. | 429/26 |
| 2008/0226964 A1 | 9/2008 | Nishiyama et al. | |

FOREIGN PATENT DOCUMENTS

| | | |
|---|---|---|
| JP | 2001-266925 | 9/2001 |
| JP | 2003-331905 | 11/2003 |
| JP | 2004-127786 | 4/2004 |
| JP | 2005-190763 | 7/2005 |
| JP | 2005-222764 | 8/2005 |
| JP | 2005-259422 | 9/2005 |
| JP | 2005-332674 | 12/2005 |
| JP | 2006-49129 | 2/2006 |
| JP | 2007-87761 | 4/2007 |
| JP | 2007-95351 | 4/2007 |
| JP | 2007-280613 | 10/2007 |
| JP | 2007-287509 | 11/2007 |
| JP | 2008-226711 | 9/2008 |
| JP | 2009129545 A * | 6/2009 |

OTHER PUBLICATIONS

Japanese Office Action for Application No. 2009-014447, 3 pages, dated Apr. 3, 2012.

* cited by examiner

FUEL CELL STACK COUPLED TO A HUMIDIFIER VIA AN INCLINED CHANNEL

CROSS-REFERENCE TO RELATED APPLICATION

This application is based upon and claims the benefit of priority from Japanese Patent Applications No. 2009-014447 filed on Jan. 26, 2009 and No. 2009-218892 filed on Sep. 24, 2009, in the Japan Patent Office, of which the contents are incorporated herein by reference.

BACKGROUND OF THE INVENTION

1. Field of the Invention

The present invention relates to a fuel cell stack formed by stacking a plurality of power generation cells in a stacking direction. A reactant gas discharge passage extends through the fuel cell stack for allowing a reactant gas after partially consumed in power generation reaction to flow through the reactant gas discharge passage in the stacking direction. An end plate is provided at one end of the fuel cell stack in the stacking direction, and a humidifier connected to the reactant gas discharge passage is attached to the end plate.

2. Description of the Related Art

For example, a solid polymer electrolyte fuel cell employs an electrolyte membrane comprising a polymer ion exchange membrane. The electrolyte membrane is interposed between an anode and a cathode to form a membrane electrode assembly (MEA). The membrane electrode assembly is sandwiched between separators to form a power generation cell. In use, normally, a predetermined number of power generation cells are stacked together to form a fuel cell stack for use in a vehicle.

The fuel cell stack mostly adopts internal manifold structure for supplying a fuel gas and an oxygen-containing gas as reactant gases to anodes and cathodes of the stacked power generation cells, respectively. The internal manifolds include reactant gas supply passages and reactant gas discharge passages extending through the power generation cells in the stacking direction.

An external device such as a humidifier is connected to the reactant gas discharge passage of the fuel cell stack through a discharge pipe. In the structure, minute electrical current may flow from the portion connecting the fuel cell stack and the discharge pipe through condensed water (short-circuiting through liquid).

In an attempt to suppress short-circuiting through liquid of this type, for example, a fuel cell system as disclosed in Japanese Laid-Open Patent Publication No. 2005-332674 is proposed. As shown in FIG. 13, the fuel cell system includes a fuel cell stack 1. The fuel cell stack 1 has a stack body formed by stacking a plurality of cell modules 2. At opposite ends of the stack body in the stacking direction, end plates 3a, 3b are provided.

Supply pipes 4a, 5a, 6a and discharge pipes 4b, 5b, 6b are connected to one end plate 3a for the humidified hydrogen, the humidified air, and the coolant, respectively. The supply pipes 4a to 6a and the discharge pipes 4b to 6b are made of electrically insulating material.

However, in Japanese Laid-Open Patent Publication No. 2005-332674, in particular, the water produced in power generation reaction tends to be condensed, and retained in an air discharge passage (not shown) connected to the discharge pipe 5b. Further, water component of the water diffused back through the electrolyte membrane tends to be condensed, and retained in a hydrogen gas discharge passage (not shown) connected to the discharge pipe 4b.

In the structure, the condensed water is discharged into the discharge pipes 4b, 5b by the reactant gas discharging pressure. As a result, short-circuiting may occur between the metal members through the liquid, i.e., the condensed water. In an attempt to address the problem, the discharge pipes 4b, 5b may be designed to be considerably elongated to increase the insulation resistance. However, since the discharge pipes 4b, 5b are made of electrically insulating material, if the discharge pipes 4b, 5b are elongated, the strength of the discharge pipes 4b, 5b may become insufficient. Further, the piping operation may become laborious, and the pipe structure may have a large scale.

SUMMARY OF THE INVENTION

A main object of the present invention is to provide a fuel cell stack having simple and compact structure in which it is possible to reliably prevent short-circuiting through liquid, and maintain the desired power generation performance.

The present invention relates to a fuel cell stack formed by stacking a plurality of power generation cells in a stacking direction. A reactant gas discharge passage allows a reactant gas after partially consumed in power generation reaction to flow through the reactant gas discharge passage in the stacking direction. An end plate is provided at one end of the fuel cell stack in the stacking direction, and a humidifier connected to the reactant gas discharge passage is attached to the end plate.

The end plate has an opening as a reactant gas outlet connected to the reactant gas discharge passage, and the humidifier has a water-containing reactant gas inlet having an inclined channel inclined downwardly toward the reactant gas outlet. The reactant gas outlet and the water-containing reactant gas inlet are connected by an electrically insulating pipe. The electrically insulating pipe at least extends up to an end of the inclined channel where inclination of the inclined channel is started.

Further, the humidifier includes a humidifier joint connected to the reactant gas discharge passage. The humidifier joint has a reactant gas inlet for allowing the reactant gas to flow into the humidifier. The end plate and the humidifier joint are connected by an electrically insulating pipe having a reactant gas ejection port connected to the reactant gas inlet. A gap is formed between an outer circumference of the electrically insulating pipe and an inner wall of the humidifier joint for allowing the reactant gas to partially flow through the gap.

Further, according to another aspect of the present invention, the present invention relates to a fuel cell stack formed by stacking a plurality of power generation cells in a stacking direction, and a reactant gas discharge passage allows a reactant gas after partially consumed in power generation reaction to flow through the reactant gas discharge passage in the stacking direction. An end plate is provided at one end of the fuel cell stack in the stacking direction. A reactant gas circulation apparatus is connected to the end plate for returning the reactant gas after partially consumed to the power generation cells. The reactant gas circulation apparatus is connected to the reactant gas discharge passage.

The end plate has an opening as a reactant gas outlet connected to the reactant gas discharge passage, and the reactant gas circulation apparatus has a water-containing reactant gas inlet having an inclined channel inclined downwardly toward the reactant gas outlet. The reactant gas outlet and the water-containing reactant gas inlet are connected by an electrically insulating pipe. The electrically insulating pipe at least extends up to an end of the inclined channel where inclination of the inclined channel is started.

According to the present invention, the reactant gas discharged from the reactant gas discharge passage to the reactant gas outlet flows through the electrically insulating pipe, and then, the reactant gas is supplied to the humidifier or the water-containing reactant gas inlet of the reactant gas circulation apparatus. The water-containing reactant gas inlet has the inclined channel inclined upwardly in a direction away from the reactant gas outlet. Therefore, the water component in the reactant gas supplied to the water-containing reactant gas inlet moves toward the reactant gas outlet along the slope of the inclined channel easily.

In the structure, electrically insulating pipe at least extends up to an end of the inclined channel where inclination of the inclined channel is started. Therefore, the water is not retained at the water-containing reactant gas inlet, and no electrically conductive path (short-circuiting through liquid) connecting the inside to the outside of the fuel cell stack through the electrically conductive portion is formed. With simple and compact structure, it becomes possible to suitably prevent short-circuiting through liquid from the fuel cell stack.

Further, according to the present invention, the reactant gas discharged from the reactant gas discharge passage to the reformer partially flows into the gap between the outer circumference of the electrically insulating pipe and the inner wall of the humidifier joint. In the structure, it is possible to prevent liquid droplets from being retained at the reaction gas ejection port of the electrically insulating pipe, and prevent continuation of liquid through the retained water to the humidifier joint.

Therefore, no electrically conductive path (short-circuiting through liquid) connecting the inside to the outside of the fuel cell stack through the electrically conductive portion is formed. With simple and compact structure, it becomes possible to suitably prevent short-circuiting through liquid from the fuel cell stack, and maintain the desired power generation performance.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
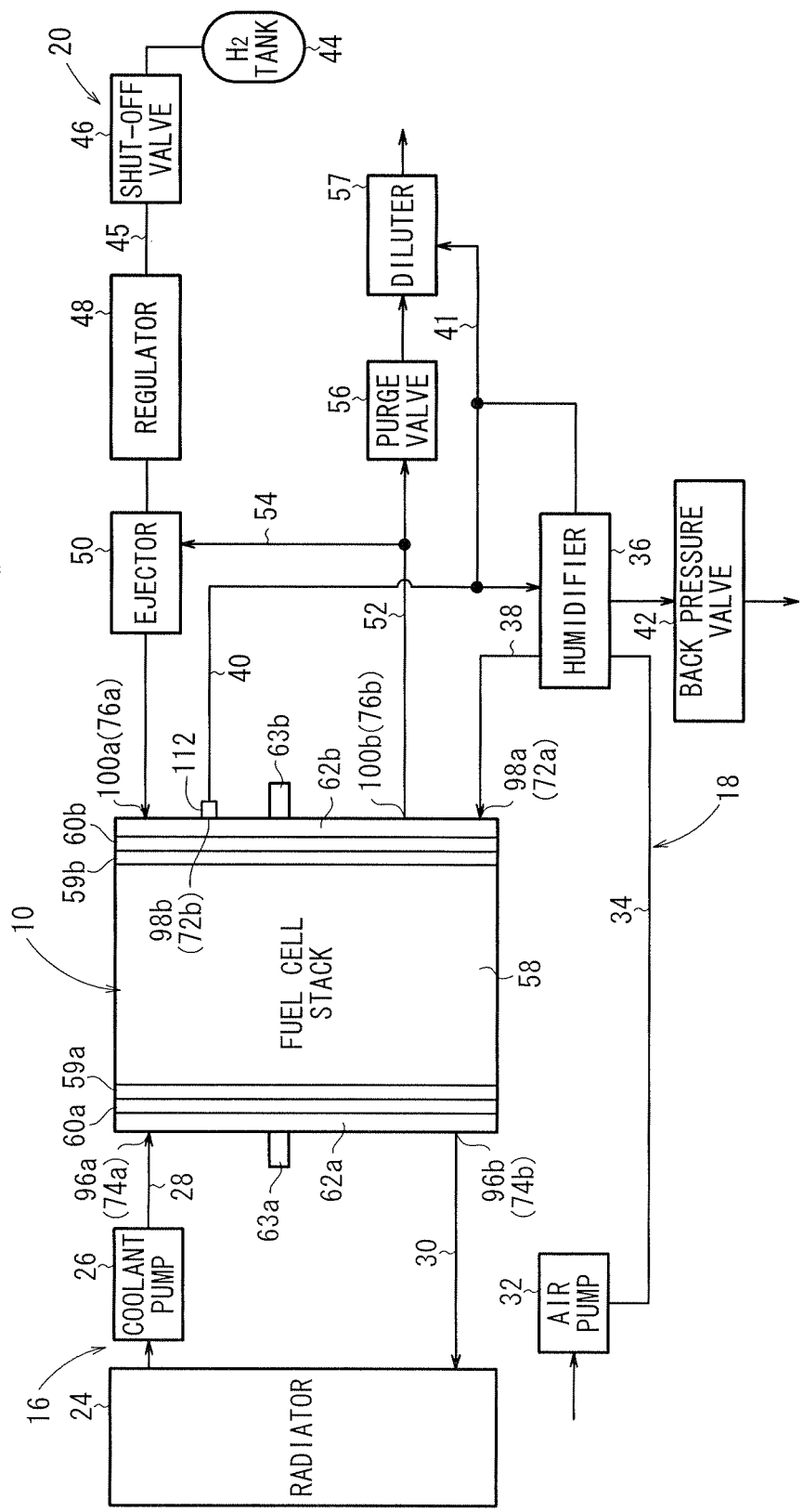
FIG. 1 is a diagram schematically showing structure of a fuel cell system including a fuel cell stack according to a first embodiment of the present invention.

In FIG. 1, a fuel cell system 12 including a fuel cell stack 10 according to a first embodiment of the present invention is mounted in a fuel cell vehicle (not shown). The fuel cell system 12 includes the fuel cell stack 10, a coolant supply mechanism 16 for supplying a coolant to the fuel cell stack 10, an oxygen-containing gas supply mechanism 18 for supplying an oxygen-containing gas (reactant gas) to the fuel cell stack 10, and a fuel gas supply mechanism 20 for supplying a fuel gas (reactant gas) to the fuel cell stack 10.

The coolant supply mechanism 16 includes a radiator 24. The radiator 24 is connected to a coolant supply pipe 28 through a coolant pump 26, and connected to a coolant discharge pipe 30.

The oxygen-containing gas supply mechanism 18 includes an air pump 32. One end of an air supply pipe 34 is connected to the air pump 32, and the other end of the air supply pipe 34 is connected to a humidifier 36. The humidifier 36 is connected to the fuel cell stack 10 through a humidified air supply pipe 38.

An off gas supply channel (water-containing reactant gas inlet, reactant gas inlet) 40 for supplying the partially consumed oxygen-containing gas including the produced water (hereinafter referred to as the off gas) as humidified fluid from the fuel cell stack 10 is connected to the humidifier 36. The humidifier 36 has a back pressure valve 42 on a side where the off gas supplied through the off gas supply channel 40 is discharged.

The fuel gas supply mechanism 20 includes a fuel gas tank 44 where a hydrogen gas is stored as a fuel gas. One end of a fuel gas supply pipe 45 is connected to the fuel gas tank 44, and a shut-off valve 46, a regulator 48, and an ejector 50 are connected to the fuel gas supply pipe 45. The ejector 50 is connected to the fuel cell stack 10.

An exhaust fuel gas pipe 52 for discharging the consumed fuel containing gas is connected to the fuel cell stack 10. The exhaust fuel gas pipe 52 is connected to the ejector 50 through a return pipe 54, and also connected to a diluter 57 through a purge valve 56. Air for dilution can be supplied to the diluter 57 through a dilution channel 41 branched from the off gas supply channel 40, and condensed water from the humidifier 36 can be supplied to the diluter 57.

Figure 2:
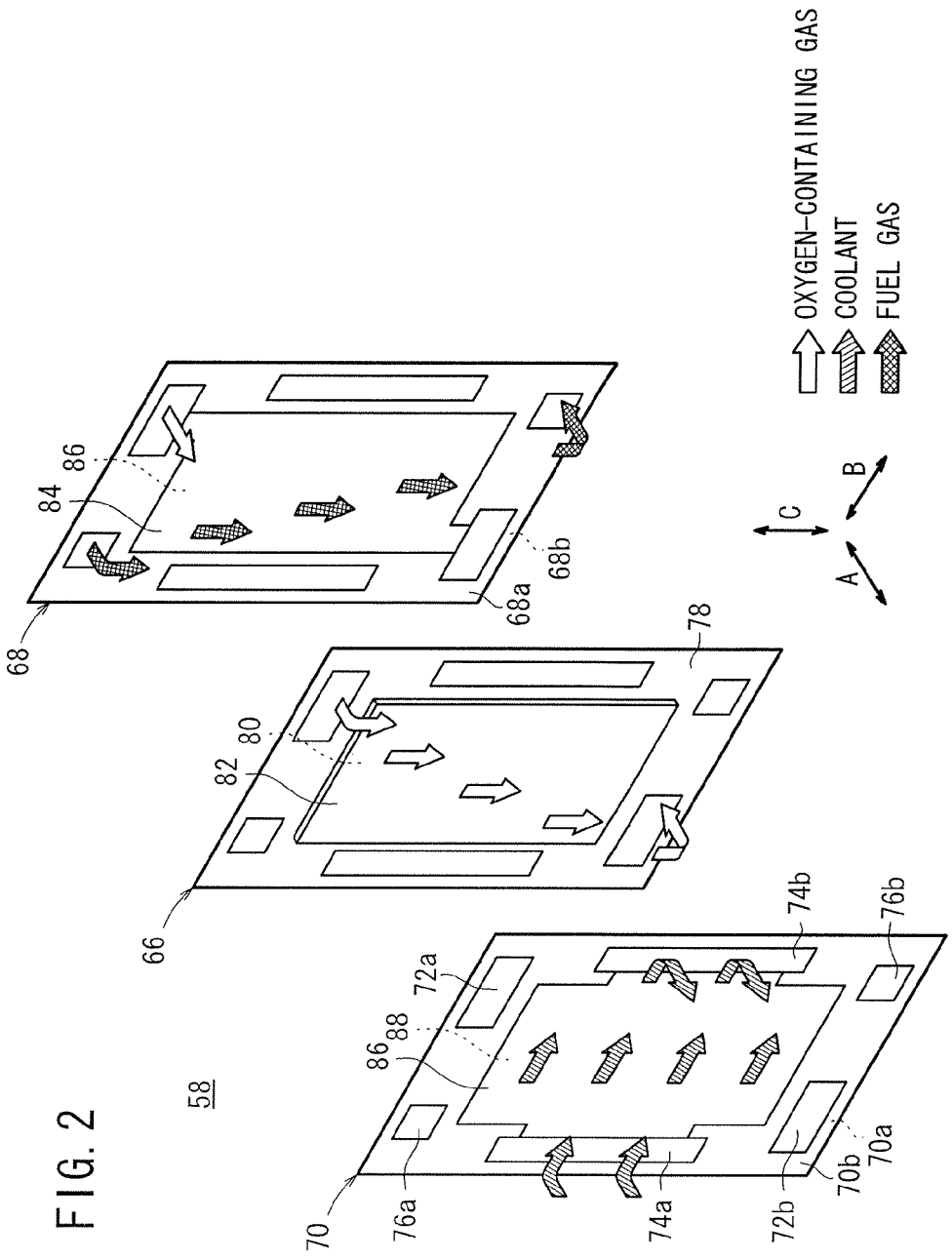
FIG. 2 is an exploded perspective view showing a power generation cell of the fuel cell stack.
Figure 3:
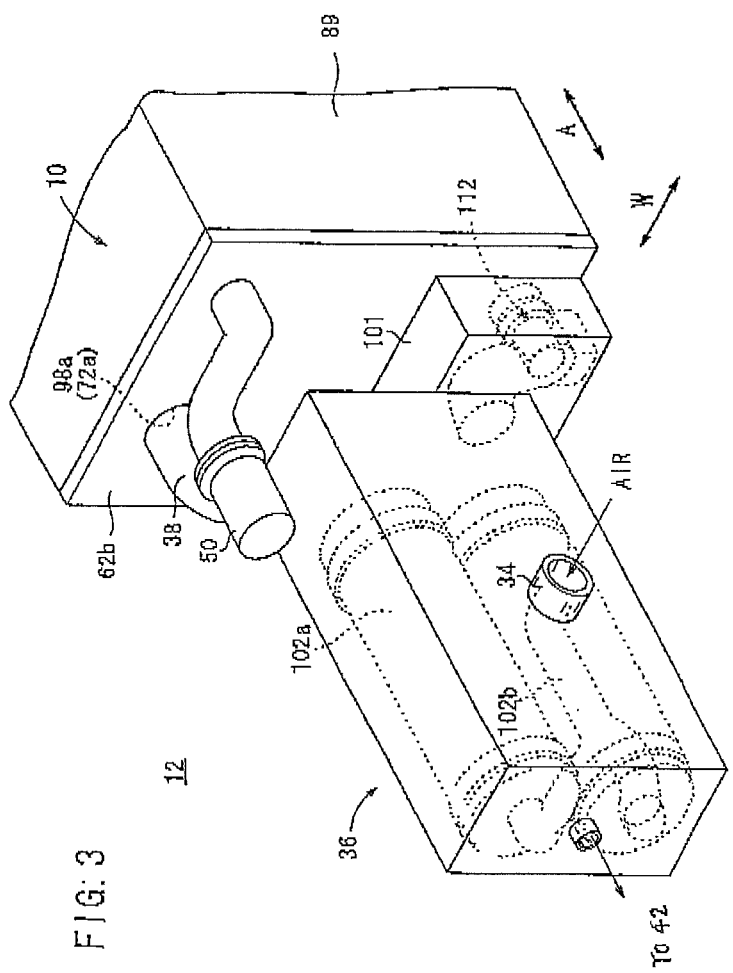
FIG. 3 is a perspective view showing a humidifier and a fuel cell stack of the fuel cell system.

The fuel cell stack 10 is formed by stacking a plurality of power generation cells 58 horizontally in a longitudinal direction of the vehicle indicated by an arrow A in FIGS. 2 and 3. As shown in FIG. 1, at opposite ends of the power generation cells 58 in the stacking direction, metal end plates 62a, 62b are provided through terminal plates 59a, 59b and insulating plates 60a, 60b. Power collecting terminals 63a, 63b protrude from the terminal plates 59a, 59b outwardly in the stacking direction, and are connected to a travel motor and auxiliary devices (not shown).

As shown in FIG. 2, each of the power generation cells 58 includes a membrane electrode assembly 66, and first and second separators 68, 70 sandwiching the membrane electrode assembly 66. The power generation cells 58 have an elongated shape. The first and second separators 68, 70 are carbon separators or metal separators.

At one end (upper end) of the power generation cell 58 in a longitudinal direction indicated by an arrow C, an oxygen-containing gas supply passage 72a for supplying an oxygen-containing gas and a fuel gas supply passage 76a for supplying a fuel gas such as a hydrogen-containing gas are provided. The oxygen-containing gas supply passage 72a and the fuel gas supply passage 76a extend through the power generation cell 58 in the direction indicated by the arrow A.

At the other end (lower end) of the power generation cell 58 in the longitudinal direction, an oxygen-containing gas discharge passage (reactant gas discharge passage) 72b for discharging the oxygen-containing gas, and a fuel gas discharge passage (reactant gas discharge passage) 76b for discharging the fuel gas are provided. The oxygen-containing gas discharge passage 72b and the fuel gas discharge passage 76b extend through the power generation cell 58 in the direction indicated by the arrow A.

At one end of the power generation cell 58 in a lateral direction indicated by an arrow B, a coolant supply passage 74a for supplying a coolant is provided. At the other end of the power generation cell 58 in the lateral direction, a coolant discharge passage 74b for discharging the coolant is provided. The coolant supply passage 74a and the coolant discharge passage 74b are elongated in a longitudinal direction.

The membrane electrode assembly 66 includes an anode 80, a cathode 82, and a solid polymer electrolyte membrane 78 interposed between the anode 80 and the cathode 82. The solid polymer electrolyte membrane 78 is formed by impregnating a thin membrane of perfluorosulfonic acid with water, for example.

The first separator 68 has a fuel gas flow field 84 on its surface 68a facing the membrane electrode assembly 66. The fuel gas flow field 84 is connected to the fuel gas supply passage 76a and the fuel gas discharge passage 76b. For example, the fuel gas flow field 84 comprises a plurality of grooves extending in the direction indicated by the arrow C. Further, a coolant flow field 86 is formed on a surface 68b opposite to the surface 68a of the first separator 68. The coolant flow field 86 is connected to the coolant supply passage 74a and the coolant discharge passage 74b.

The second separator 70 has an oxygen-containing gas flow field 88 on its surface 70a facing the membrane electrode assembly 66. For example, the oxygen-containing gas flow field 88 comprises grooves extending in the direction indicated by the arrow C. The oxygen-containing gas flow field 88 is connected to the oxygen-containing gas supply passage 72a and the oxygen-containing gas discharge passage 72b. A surface 70b opposite to the surface 70a of the second separator 70 is overlapped with the surface 68b of the first separator 68 to form the coolant flow field 86. Though not shown, seal members are provided integrally with the first and second separators 68, 70. Alternatively, separate seal members are provided on the first and second separators 68, 70.

As shown in FIG. 3, the fuel cell stack 10 includes a casing 89 including the end plates 62a, 62b. Instead of using the casing 89, components between the end plates 62a, 62b may be tightened by connecting the end plates 62a, 62b using tie-rods (not shown).

As shown in FIG. 1, the end plate 62a has a coolant inlet 96a and a coolant outlet 96b. The coolant inlet 96a is connected to the coolant supply passage 74a and the coolant outlet 96b is connected to the coolant discharge passage 74b. Further, the coolant inlet 96a and the coolant outlet 96b are connected to the radiator 24 through the coolant supply pipe 28 and the coolant discharge pipe 30.

The end plate 62b has an oxygen-containing gas inlet 98a connected to the oxygen-containing gas supply passage 72a, a fuel gas inlet 100a connected to the fuel gas supply passage 76a, an oxygen-containing gas outlet (reactant gas outlet) 98b connected to the oxygen-containing gas discharge passage 72b, and a fuel gas outlet (reactant gas outlet) 100b connected to the fuel gas discharge passage 76b.

As shown in FIG. 3, a humidifier joint 101 of the humidifier 36 is directly fixed to the end plate 62b of the fuel cell stack 10. A first humidifier unit 102a and a second humidifier unit 102b are vertically arranged in the humidifier 36. The first humidifier unit 102a and the second humidifier unit 102b are connected to the air supply pipe 34 and the humidified air supply pipe 38. For example, the first humidifier unit 102a and the second humidifier unit 102b may adopt hollow fiber membrane based humidification structure.

Figure 4:
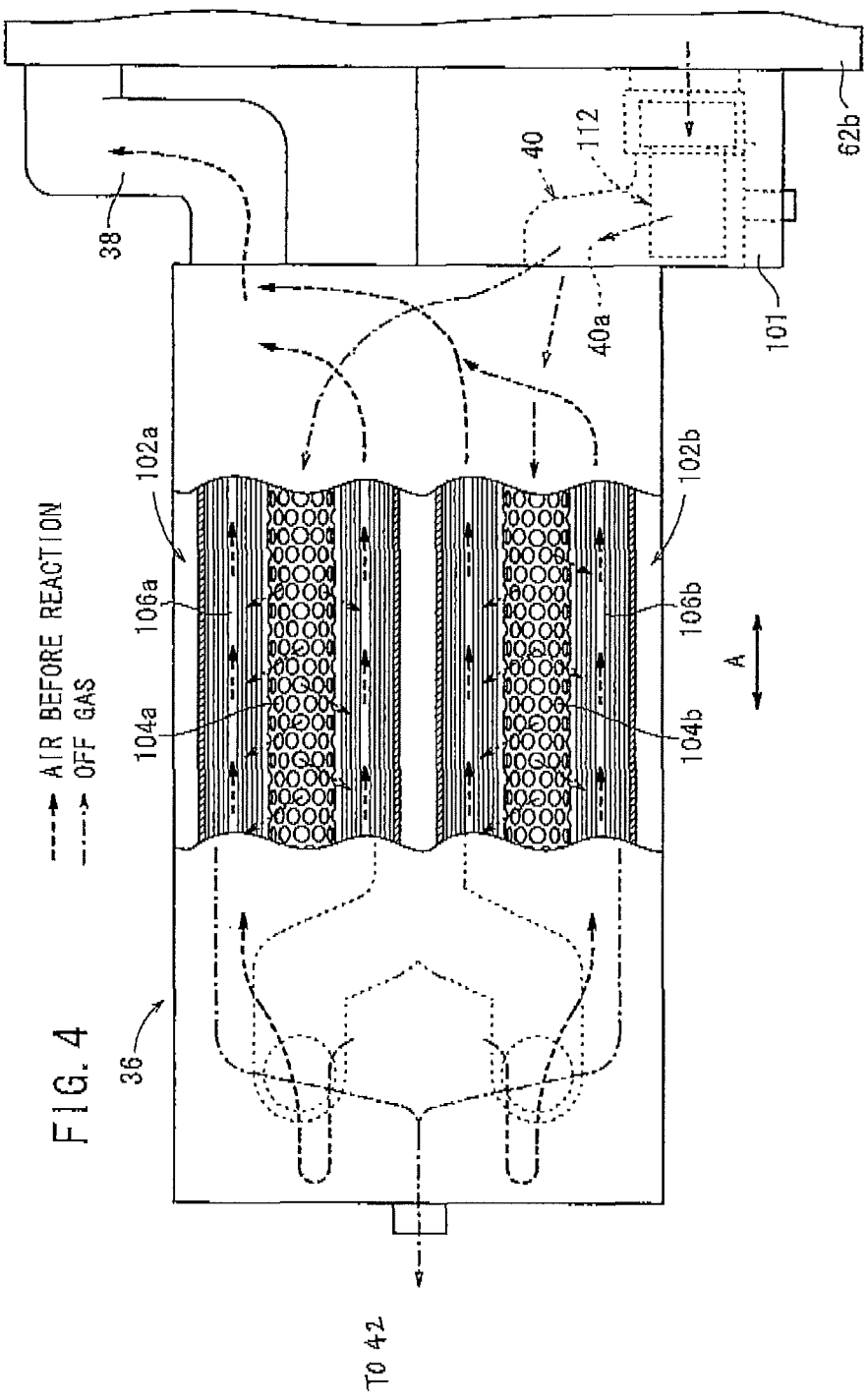
FIG. 4 is a partial cross sectional view showing components in the humidifier.

As shown in FIG. 4, multi-hole pipes 104a, 104b having a large number of holes are provided at substantially the center in the first humidifier unit 102a and the second humidifier unit 102b. A plurality of hollow fiber membranes 106a, 106b extending in the direction indicated by the arrow A are provided around the multi-hole pipes 104a, 104b. Off gas is supplied into the multi-hole pipes 104a, 104b through the off gas supply channel 40.

The air to be used in reaction is supplied into the hollow fiber membranes 106a, 106b through the air supply pipe 34. The outlet side of the hollow fiber membranes 106a, 106b is connected to the humidified air supply pipe 38.

Figure 5:
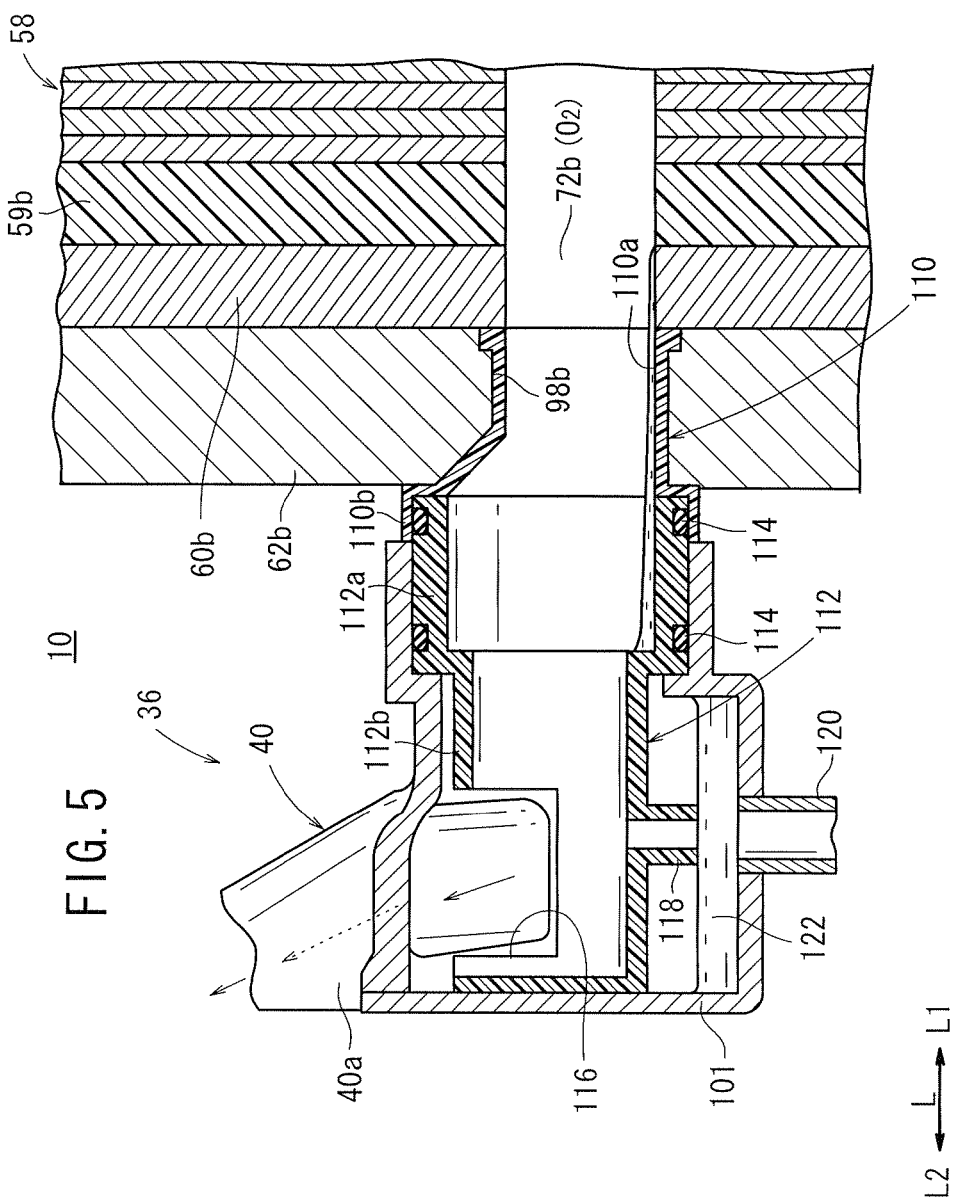
FIG. 5 is a cross sectional view showing a state in which the outlet side of an oxygen-containing gas discharge passage and the humidifier are connected by a resin pipe.

As shown in FIG. 5, a resin coupling pipe 110 is attached to the oxygen-containing gas outlet 98b of the end plate 62b. One end 110a of the resin coupling pipe 110 has a rectangular shape corresponding to the shape at the outlet of the oxygen-containing gas discharge passage 72b. The other end 110b of the resin coupling pipe 110 has a ring shape. An electrically insulating pipe such as a resin pipe 112 is connected to the other end 110b of the resin coupling pipe 110.

The end plate 62b and the humidifier joint 101 are connected by the resin pipe 112. For example, the resin pipe 112 is made of insulating material such as Polyphenylene Sulfide (PPS). The resin pipe 112 may be formed by coating resin on the surface of the metal body.

Figure 6:
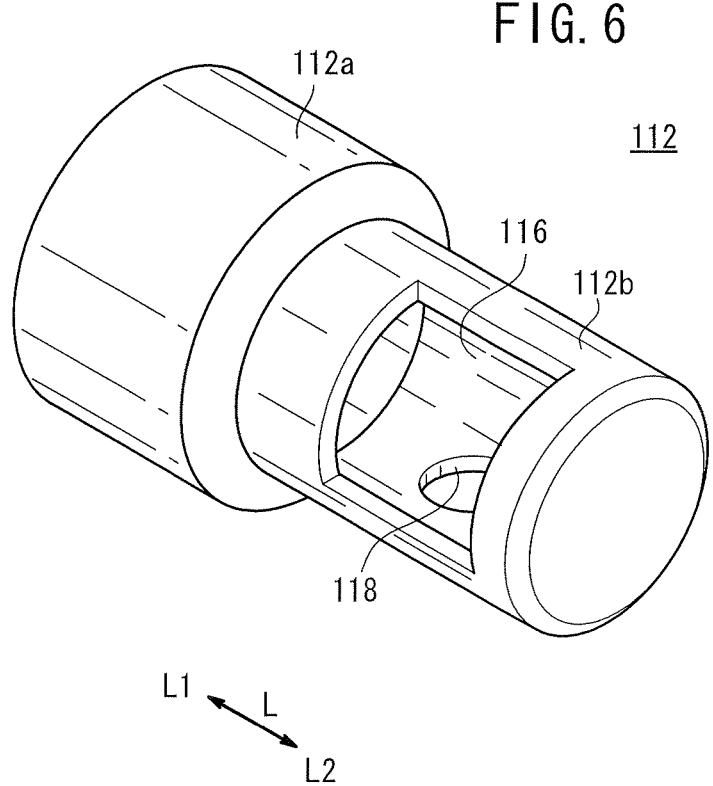
FIG. 6 is a perspective view showing the resin pipe.

As shown in FIGS. 5 and 6, the resin pipe 112 has a circular cylindrical shape, and one end 112a of the resin pipe 112 having a large diameter is inserted into the other end 110b of the resin coupling pipe 110 through an O-ring 114. The other end 112b of the resin pipe 112 having a small diameter enters the off gas supply channel 40 of the humidifier joint 101 of the humidifier 36. The off gas supply channel 40 includes an inclined channel 40a inclined downwardly toward the oxygen-containing gas outlet 98b. The other end 112b of the resin pipe 112 at least extends up to an end of the inclined channel 40a where inclination is started.

An off gas ejection port (reactant gas ejection port) 116 is formed at the other end 112b. The off gas ejection port 116 has a predetermined length from its front end in the axial direction. The off gas ejection port 116 is formed by cutting the other end 112b by a predetermined length from the upper end in the diameter direction. The off gas ejection port 116 is opened to the end of the inclined channel 40a where inclination is started.

A water drainage pipe unit 118 is provided at the outer lower end of the other end 112b, and positioned on a lower side of the off gas supply channel 40. By designing the water drainage pipe unit 118 to have a small diameter in its opening, and have a large length in its axial direction, short-circuiting through liquid can be prevented. The water drainage pipe unit 118 is connected to a water drainage chamber 122 of the humidifier 36, and the water drainage chamber 122 is connected to the diluter 57 through a water drainage pipe 120 from the dilution channel 41.

Operation of the fuel cell system 12 will be described below.

Firstly, as shown in FIG. 1, the air pump 32 of the oxygen-containing gas supply mechanism 18 is operated to suck the external air as the oxygen-containing gas, and the air is supplied into the air supply pipe 34. The air flows from the air supply pipe 34 into the humidifier 36, and is supplied to the humidified air supply pipe 38 through the hollow fiber membranes 106a, 106b of the first humidifier unit 102a and the second humidifier unit 102b (see FIG. 4).

At this time, the off gas as the oxygen-containing gas after partially consumed in the reaction as described later is supplied to the multi-hole pipes 104a, 104b through the off gas supply channel 40. Thus, the water in the off gas moves through the air before consumption, and humidifies the air. The humidified air flows from the humidified air supply pipe 38 to the oxygen-containing gas supply passage 72a in the fuel cell stack 10 through the end plate 62b.

In the meanwhile, as shown in FIG. 1, in the fuel gas supply mechanism 20, the shut-off valve 46 is opened, and the pressure of the fuel gas (hydrogen gas) in the fuel gas tank 44 is decreased by the regulator 48. Thereafter, the fuel gas flows through the ejector 50, and the fuel gas is supplied into the fuel gas supply passage 76a in the fuel cell stack 10.

Further, in the coolant supply mechanism 16, by operation of the coolant pump 26, the coolant flows from the coolant supply pipe 28 to the end plate 62a. Thus, the coolant is supplied into the coolant supply passage 74a in the fuel cell stack 10.

As shown in FIG. 2, after the air is supplied to each of the power generation cells 58 in the fuel cell stack 10, the air flows from the oxygen-containing gas supply passage 72a to the oxygen-containing gas flow field 88 of the second separator 70, and flows along the cathode 82 of the membrane electrode assembly 66 for inducing an electrochemical reaction at the cathode 82. The fuel gas flows from the fuel gas supply passage 76a to the fuel gas flow field 84 of the first separator 68, and flows along the anode 80 of the membrane electrode assembly 66 for inducing an electrochemical reaction at the anode 80.

Thus, in each of the membrane electrode assemblies 66, the oxygen in the air supplied to the cathode 82, and the fuel gas (hydrogen) supplied to the anode 80 are partially consumed in the electrochemical reactions at catalyst layers of the cathode 82 and the anode 80 for generating electricity.

The air after partially consumed at the cathode 82 flows along the oxygen-containing gas discharge passage 72b, and is discharged as the off gas from the end plate 62b to the off gas supply channel 40 (see FIG. 1).

At this time, the water produced in the power generation at the cathode 82 flows into the oxygen-containing gas discharge passage 72b. In the oxygen-containing gas discharge passage 72b, the water flowing toward the end plate 62b in the off gas flow is discharged to the off gas supply channel 40.

In the first embodiment, as shown in FIG. 5, the resin pipe 112 connecting the oxygen-containing gas discharge passage 72b and the off gas supply channel 40 is attached between the end plate 62b and the humidifier 36. The resin pipe 112 is made of insulating material. The other end 112b of the resin pipe 112 having the small diameter enters the off gas supply channel 40, and at least extends up to the end of the inclined channel 40a of the off gas supply channel 40 where inclination is started.

The off gas ejection port 116 connected to the inclined channel 40a is formed in the outer circumference of the other end 112b. In the structure, the air after partially consumed in the power generation in the fuel cell stack 10 flows from the oxygen-containing gas discharge passage 72b to the resin coupling pipe 110 and the resin pipe 112, and flows from the off gas ejection port 116 to the off gas supply channel 40.

The off gas supply channel 40 has the inclined channel 40a inclined upwardly toward a direction spaced away from the oxygen-containing gas outlet 98b. In the structure, the water in the air supplied to the off gas supply channel 40 tends to flow toward the oxygen-containing gas outlet 98b along the slope of the inclined channel 40a.

The off gas ejection port 116 formed at the other end 112b of the resin pipe 112 is opened to the end of the inclined channel 40a where inclination is started. In the structure, the water moving along the inclined channel 40a is not retained continuously from the electrically conductive off gas supply channel 40 into the oxygen-containing gas discharge passage 72b, and the water is reliably collected into the one end 112a of the resin pipe 112 having the large diameter.

Thus, no electrically conductive path (short-circuiting through liquid) connecting the inside to the outside of the fuel cell stack 10 through the electrically conductive off gas supply channel 40 is formed. With simple and compact structure, it becomes possible to suitably prevent short-circuiting through liquid from the fuel cell stack 10.

Further, at the outer lower portion of the other end 112b of the resin pipe 112, the water drainage pipe unit 118 having a small diameter is provided, and the water drainage pipe unit 118 is elongated in the axial direction. The water droplets (condensed water) returned to the other end 112b are discharged to the water drainage chamber 122. Thus, it is ensured that the retained water separately flows into the resin pipe 112 and the water drainage chamber 122, and formation of the path for short-circuiting through liquid is prevented suitably (see FIG. 5).

Further, the water drainage chamber 122 is connected to the diluter 57 through the water drainage pipe 120. In the structure, by the sucking action of the air for dilution supplied into the diluter 57 through the dilution channel 41, the condensed water is suitably and reliably discharged from the water drainage chamber 122 to the diluter 57.

In the meanwhile, the fuel gas after partially consumed at the anode 80 flows along the fuel gas discharge passage 76b, and is discharged as the exhaust fuel gas from the end plate 62b to the exhaust fuel gas pipe 52 (see FIG. 1). The exhaust fuel gas discharged to the exhaust fuel gas pipe 52 partially flows through the return pipe 54, and returns to the fuel gas supply pipe 45 by sucking operation of the ejector 50.

The exhaust fuel gas is mixed with the fresh fuel gas, and then, supplied from the fuel gas supply pipe 45 to the fuel cell stack 10. The remaining exhaust fuel gas is discharged when the purge valve 56 is opened.

Further, as shown in FIG. 2, the coolant flows from the coolant supply passage 74a to the coolant flow field 86 between the first and second separators 68, 70, and flows in the direction indicated by the arrow B. After the coolant cools the membrane electrode assembly 66, the coolant flows through the coolant discharge passage 74b, and the coolant is discharged from the coolant outlet 96b of the end plate 62a to the coolant discharge pipe 30. In FIG. 1, after the coolant is cooled by the radiator 24, by operation of the coolant pump 26, the coolant is supplied from the coolant supply pipe 28 to the fuel cell stack 10.

Figure 7:
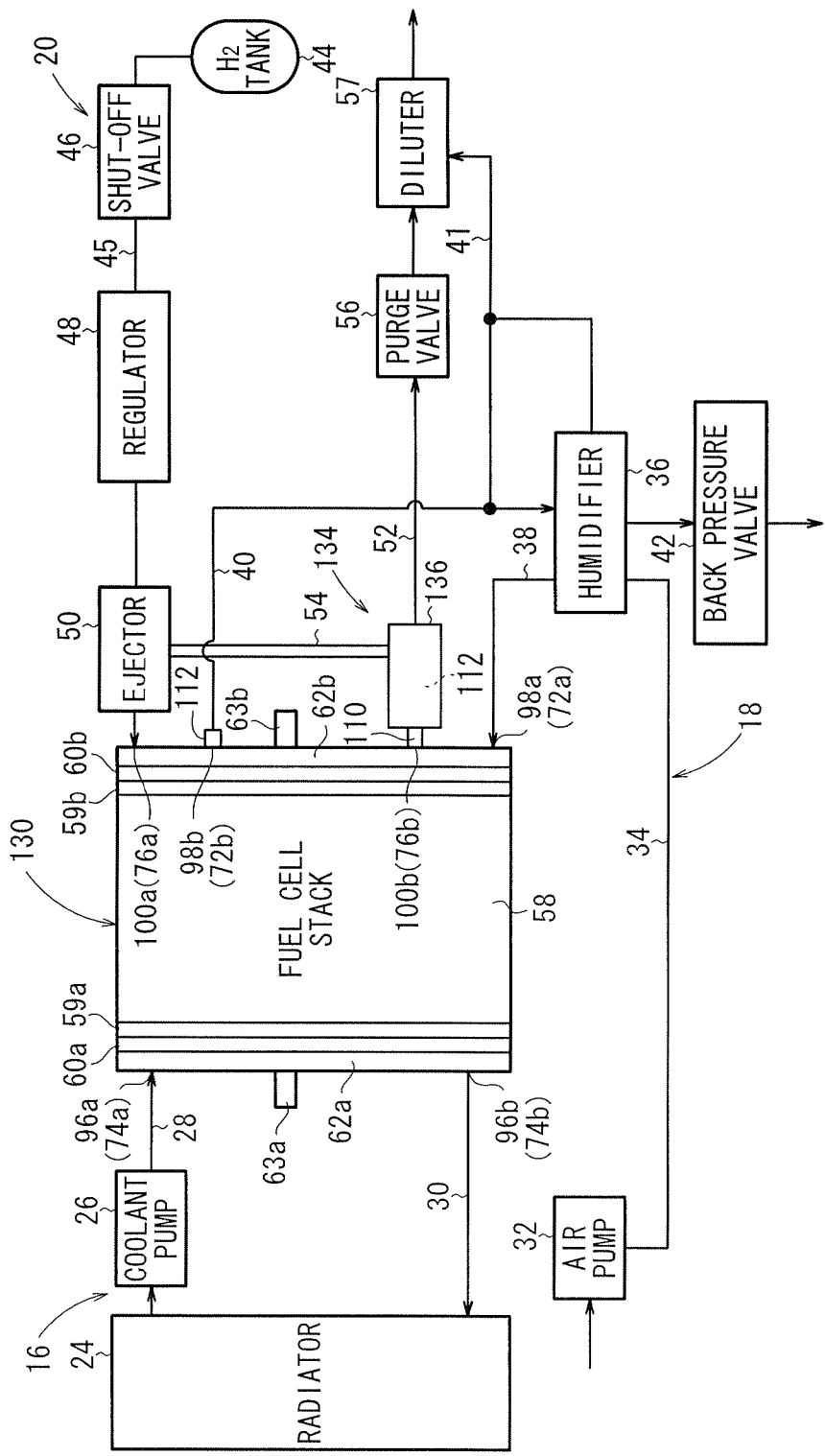
FIG. 7 is a diagram schematically showing structure of a fuel cell system including a fuel cell stack according to a second embodiment of the present invention.

FIG. 7 is a diagram schematically showing structure of a fuel cell system 132 including a fuel cell stack 130 according to a second embodiment of the present invention.

The constituent elements that are identical to those of the fuel cell system 12 according to the first embodiment are labeled with the same reference numerals, and description thereof will be omitted. Also in third or further embodiments as described later, the constituent elements that are identical to those of the fuel cell system 12 according to the first embodiment are labeled with the same reference numerals, and description thereof will be omitted.

A fuel gas circulation apparatus (reactant gas circulation apparatus) 134 is attached to the fuel cell stack 130. The fuel gas circulation apparatus 134 includes a gas-liquid separator 136 attached to the fuel gas outlet 100b of the end plate 62b, and the ejector 50 connected to the gas-liquid separator 136 through the return pipe 54.

A resin coupling pipe 110 is attached to a fuel gas outlet 100b of the end plate 62b, and an electrically insulating pipe such as a resin pipe 112 is connected to the resin coupling pipe 110.

In the second embodiment, the water produced by power generation of the fuel cell stack 130 flows along the fuel gas supply passage 76a, and then, the water is discharged from the end plate 62b to the gas-liquid separator 136. The fuel gas outlet 100b of the end plate 62b is connected to the resin pipe 112 through the resin coupling pipe 110.

Thus, as in the case of the first embodiment, the water supplied into the gas-liquid separator 136 can be collected reliably using the resin pipe 112, and it is possible to suitably prevent short-circuiting through liquid from the fuel cell stack 130.

In the second embodiment, the fuel gas circulation apparatus 134 used for circulating the fuel gas is used. However, the present invention is not limited in this respect. For example, in the case where pure oxygen is used as the oxygen-containing gas, the invention may be applied to an oxygen-containing gas circulation apparatus (not shown) for circulating the pure oxygen.

Figure 8:
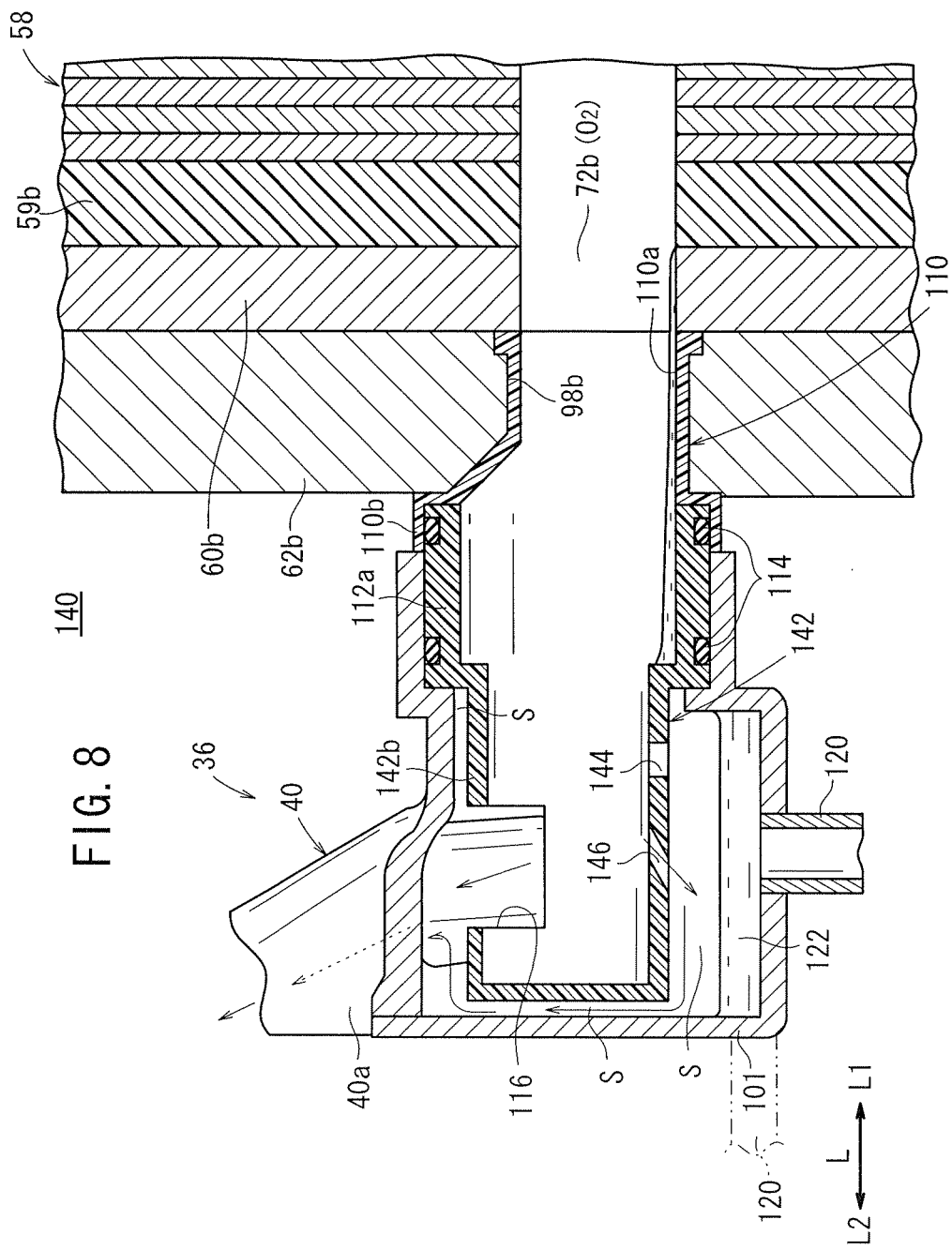
FIG. 8 is a cross sectional view showing main components of a fuel cell stack according to a third embodiment of the present invention.

FIG. 8 is a cross sectional view showing main components of a fuel cell stack 140 according to a third embodiment of the present invention.

Figure 9:
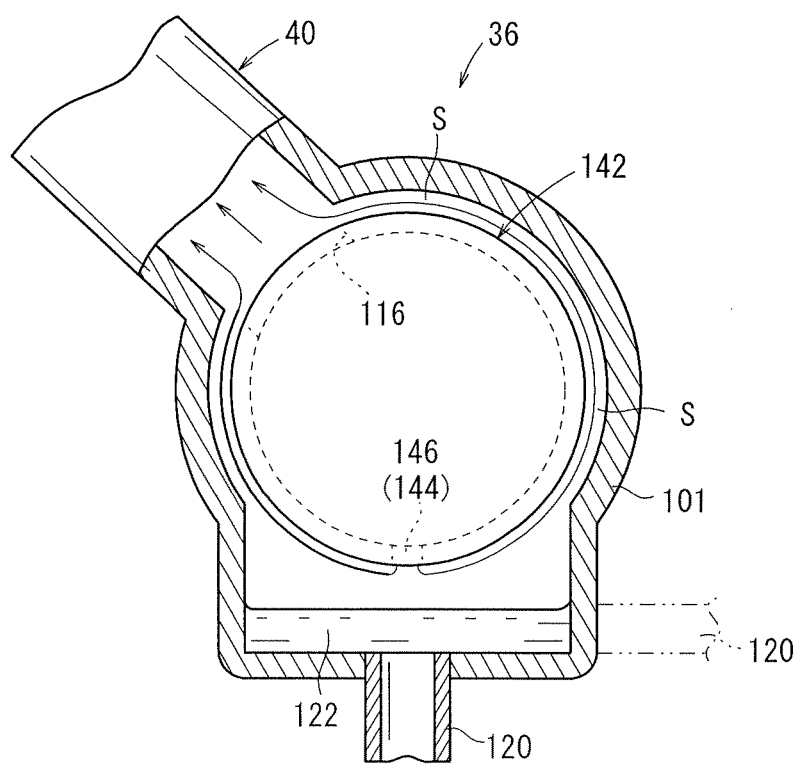
FIG. 9 is a front view showing a resin pipe of the fuel cell stack.

The fuel cell stack 140 includes a resin pipe 142 connecting the end plate 62b and the humidifier joint 101. A gap S is formed between the outer circumference of the other end 142b of the resin pipe 142 having a small diameter and the inner wall of the humidifier joint 101 (see FIGS. 8 and 9). Part of the off gas flows through the gap S. The cross sectional area in the opening of the off gas ejection port 116 is smaller than the channel cross sectional area in the other end 142b of the resin pipe 142.

At the lowermost end of the outer circumference of the other end 142b, a drain hole 144 is formed in a predetermined direction, e.g., in a direction of gravity. The drain hole 144 is connected to a water drainage chamber 122 of the humidifier joint 101, and the water drainage chamber 122 is connected from the dilution channel 41 to the diluter 57 through a water drainage pipe 120.

In the illustrated embodiment, the water drainage pipe 120 is provided at the bottom of the humidifier joint 101, and extends in the direction of gravity. However, the present invention is not limited in this respect. For example, the water drainage pipe 120 may extend horizontally on a side of the humidifier joint 101 (see dashed double-dotted line in FIGS. 8 and 9).

Figure 10:
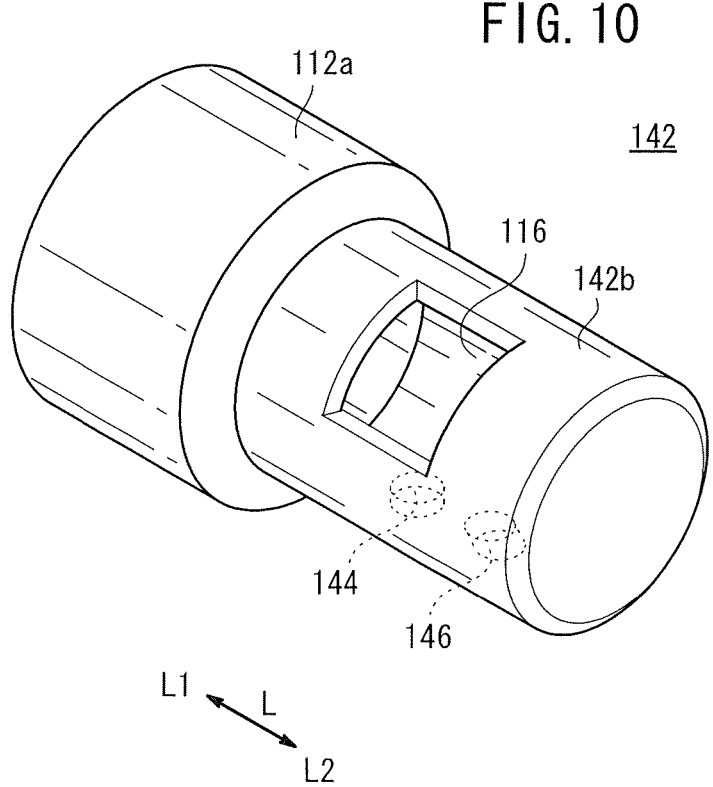
FIG. 10 is a perspective view showing the resin pipe.

At the lowermost end of the outer circumference of the other end 142b, for example, one off gas outlet (reactant gas outlet) 146 is formed on the front side of the drain hole 144 in the off gas (discharge) flow direction (direction indicated by an arrow L2). The off gas outlet 146 is inclined from the radial direction of the other end 142b, toward a direction indicated by the arrow L2 in which the off gas is discharged (see FIGS. 8 and 10).

In the third embodiment, as shown in FIG. 8, a resin pipe 142 made of insulating material is attached between the end plate 62b and the humidifier joint 101 of the humidifier 36, and the resin pipe 142 connects the oxygen-containing gas discharge passage 72b and the off gas supply channel 40.

The other end 142b of the resin pipe 142 having the small diameter enters the off gas supply channel 40, and the gap S is formed between the outer circumference of the other end 142b and the inner wall of the humidifier joint 101 such that the off gas partially flows through the gap S.

In the structure, the off gas discharged from the oxygen-containing gas discharge passage 72b to the resin pipe 142 partially flows into the gap S through the off gas outlet 146 of the resin pipe 142. Since the off gas flows into the off gas supply channel 40 through the gap S (see FIGS. 8 and 9), it is possible to prevent liquid droplets from being retained in the off gas supply channel 40, and prevent continuation of liquid through the retained water to the humidifier joint 101.

The off gas outlet 146 is inclined from the radial direction of the other end 142b toward the direction in which the off gas is discharged. In the structure, the off gas can be smoothly and reliably ejected to the off gas outlet 146 to the gap S.

Thus, no electrically conductive path (short-circuiting through liquid) connecting the inside to the outside of the fuel cell stack 10 through the electrically conductive portion is formed. With simple and compact structure, the same advantages as in the cases of the first and second embodiments are obtained. For example, it becomes possible to suitably prevent short-circuiting through liquid from the fuel cell stack 140, and the desired power generation performance is secured.

Further, the cross sectional area in the cross section of the off gas ejection port 116 is smaller than the flow channel cross sectional area in the other end 142b of the resin pipe 142. In the structure, the flow rate of the off gas at the off gas ejection port 116 is increased. By the Venturi effect, the flow of the off gas from the outer circumference of the other end 142b is facilitated. Thus, the water retained on the outer circumference of the other end 142b is forcibly sucked, and blown to the off gas supply channel 40. Accordingly, the electrically conductive path between the water and the humidifier joint 101 is interrupted reliably.

Further, at the lowermost end of the outer circumference of the other end 142b, the off gas outlet 146 is formed on the front side of the drain hole 144 in the off gas flow direction. In the structure, the off gas is ejected from the off gas outlet 146 toward the water drainage chamber 122. The water surface of the water retained in the water drainage chamber 122 is lowered. Accordingly, even if the amount of the retained water becomes comparatively large, improvement in the insulation characteristics can be achieved advantageously.

Further, the drain hole 144 is provided in the direction of gravity. In the structure, the water droplets can be discharged reliably from the other end 142b toward the water drainage chamber 122.

Further, the one end 112a of the resin pipe 112 having the larger diameter is connected to the other end 142b of the resin pipe 142 having the small diameter. In the structure, by the step between the one end 112a of the resin pipe 112 and the other end 142b of the resin pipe 142, continuation of liquid through the liquid droplets is prevented advantageously.

Figure 11:
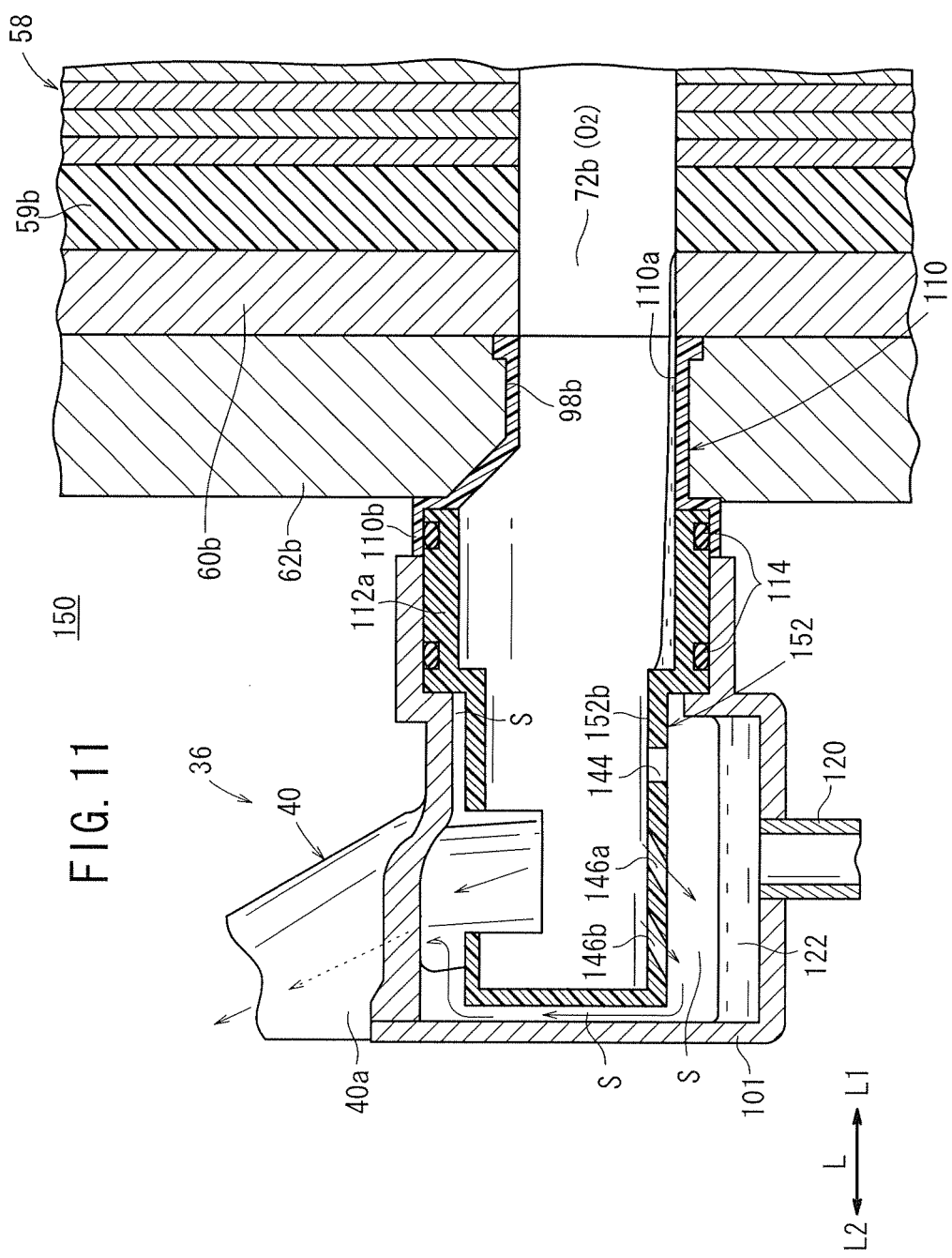
FIG. 11 is a cross sectional view showing main components of a fuel cell stack according to a fourth embodiment of the present invention.

FIG. 11 is a cross sectional view showing a fuel cell stack 150 according to a fourth embodiment of the present invention.

The fuel cell stack 150 includes a resin pipe 152 connecting the end plate 62b and the humidifier joint 101. At the lowermost position of the outer circumference of the other end 152b of the resin pipe 152 having a small diameter, a drain hole 144, a first off gas outlet 146a, and a second off gas outlet 146b are formed in this order, along the off gas flow direction. The drain hole 144 extends in the direction of gravity, and the first and second off gas outlets 146a, 146b are inclined toward the direction in which the off gas is discharged.

In the fourth embodiment, the first and second off gas outlets 146a, 146b are provided. The same advantages as in the cases of the third embodiment are obtained. For example, the off gas can be supplied to the gap S further reliably.

Figure 12:
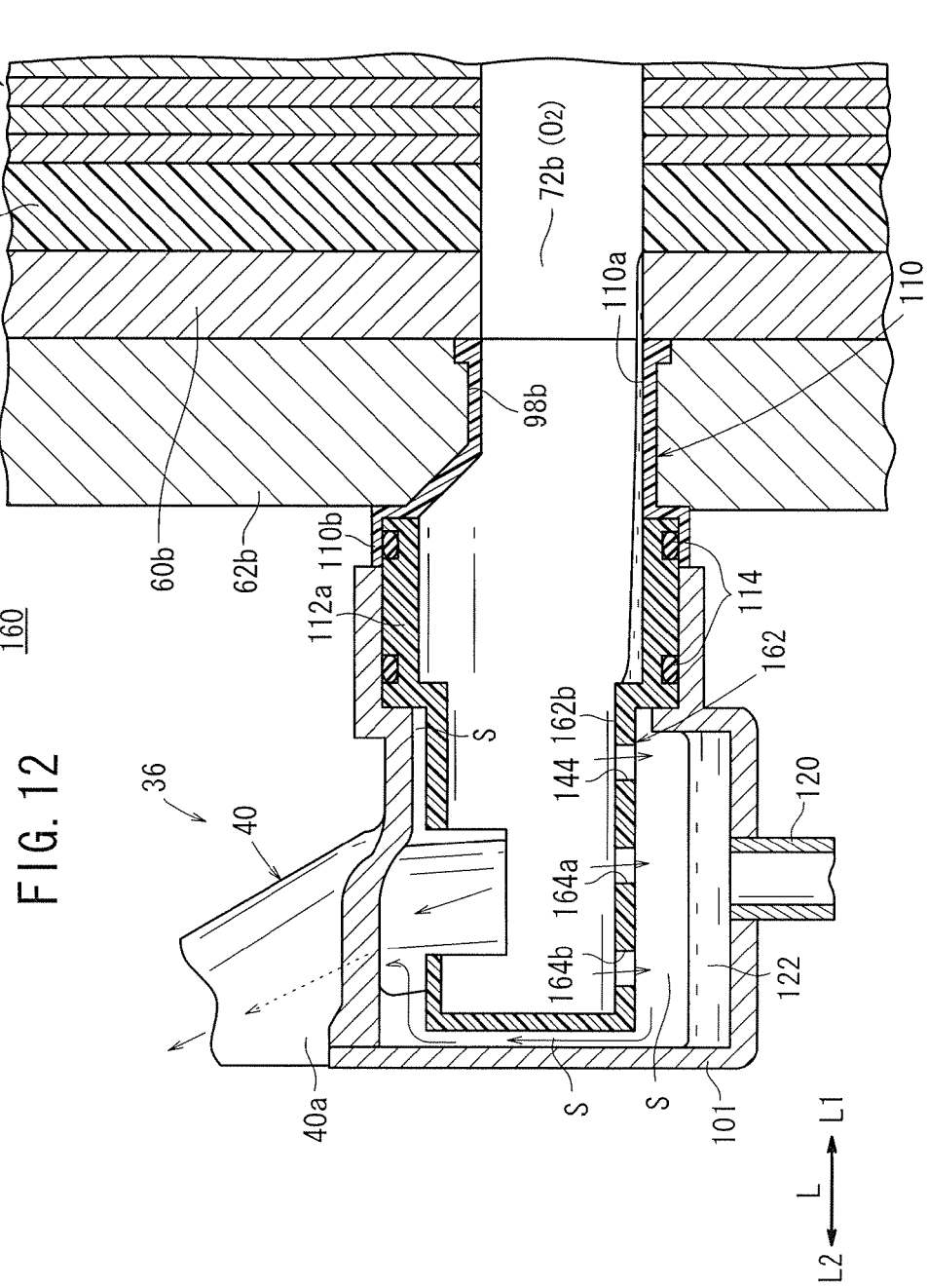
FIG. 12 is a cross sectional view showing main components of a fuel cell stack according to a fifth embodiment of the present invention.
Figure 13:
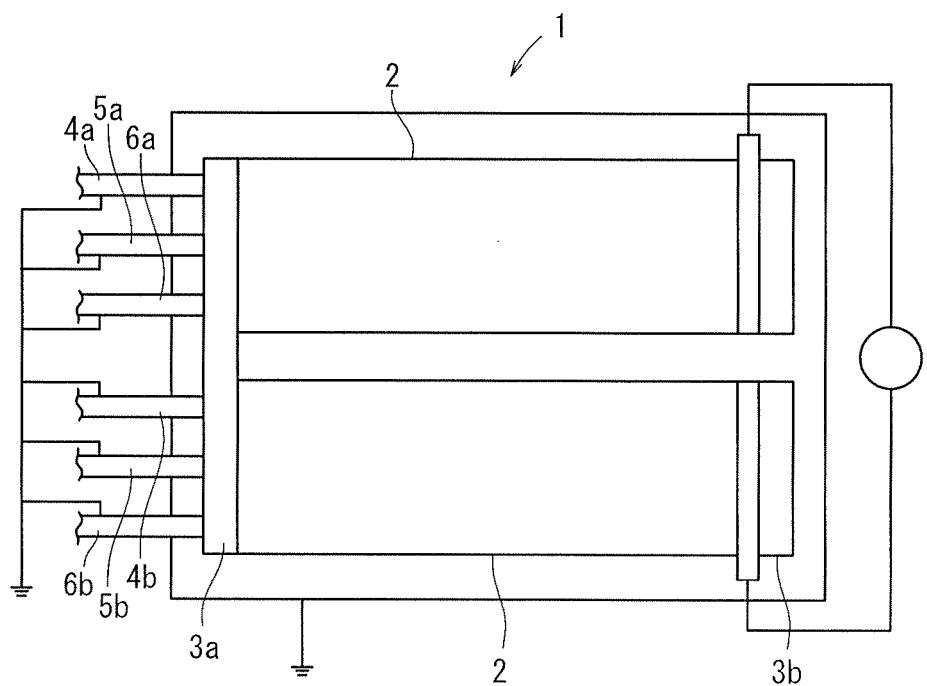
FIG. 13 is a diagram schematically showing a fuel cell system disclosed in Japanese Laid-Open Patent Publication No. 2005-332674.

FIG. 12 is a cross sectional view showing main components of a fuel cell stack 160 according to a fifth embodiment of the present invention.

The fuel cell stack 160 includes a resin pipe 162 connecting the end plate 62b and the humidifier joint 101. At the lowermost position of the outer circumference of the other end 162b of the resin pipe 162 having a small diameter, a drain hole 144, a first off gas outlet 164a, and a second off gas outlet 164b are provided in this order, along the off gas flow direction. The drain hole 144 extends in the direction of gravity. Further, the first and second off gas outlets 164a, 164b also extend in the direction of gravity.

In the fifth embodiment, the first and second off gas outlets 164a, 164b are provided. The same advantages as in the cases of the third and fourth embodiments are obtained.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell apparatus, that includes a humidifier coupled to a fuel cell stack, the fuel cell stack formed by stacking a plurality of power generation cells in a stacking direction, the fuel cell apparatus comprising:
    a reactant gas discharge passage that allows a reactant gas to flow through the reactant gas discharge passage in the stacking direction after being partially consumed in a power generation reaction,
    an end plate being provided at one end of the fuel cell stack in the stacking direction, the end plate including an opening for the reactant gas discharge passage, the humidifier located beyond the end plate in the stacking direction,
    an inclined channel inclined downwardly from an opening for the humidifier toward the end plate opening, the humidifier opening acting as a water-containing reactant gas inlet for the humidifier,
    an electrically insulating pipe directly connecting the end plate opening for the reactant gas discharge passage of the fuel cell stack to the inclined channel, the electrically insulating pipe extending at least up to an end of the inclined channel where inclination of the inclined channel with respect to the end plate opening is started, and
    a water drainage pipe connected to the electrically insulating pipe at a position below the water-containing reactant gas inlet,
    wherein the electrically insulating pipe is arranged within a humidifier joint portion of the humidifier, and wherein a gap is formed between an outer circumference of the electrically insulating pipe and an inner wall of the humidifier joint portion.

2. A fuel cell stack according to claim 1, wherein the reactant gas discharge passage is an oxygen-containing gas discharge passage for allowing an oxygen-containing gas as the reactant gas to flow through the reactant gas discharge passage.

* * * * *